United States Patent
Gu et al.

(10) Patent No.: US 11,042,311 B2
(45) Date of Patent: *Jun. 22, 2021

(54) CLUSTER SYSTEM WITH CALCULATION AND STORAGE CONVERGED

(71) Applicant: HUAWEI TECHNOLOGIES CO., LTD., Guangdong (CN)

(72) Inventors: Jiongjiong Gu, Shenzhen (CN);
Daohui Wang, Shenzhen (CN);
Xiaoyong Min, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/669,271

(22) Filed: Oct. 30, 2019

(65) Prior Publication Data

US 2020/0065010 A1 Feb. 27, 2020

Related U.S. Application Data

(63) Continuation of application No. 14/041,986, filed on Sep. 30, 2013, now Pat. No. 10,481,804, which is a
(Continued)

(51) Int. Cl.
*G06F 3/06* (2006.01)
*H04L 29/08* (2006.01)

(52) U.S. Cl.
CPC .............. *G06F 3/0619* (2013.01); *G06F 3/06* (2013.01); *G06F 3/067* (2013.01); *G06F 3/0607* (2013.01);
(Continued)

(58) Field of Classification Search
CPC ...... G06F 3/0619; G06F 3/067; G06F 3/0689; G06F 3/0665; G06F 3/06; G06F 3/0683; H04L 67/1097
See application file for complete search history.

(56) References Cited

U.S. PATENT DOCUMENTS

| 6,389,503 B1 | 5/2002 | Georgis et al. |
| 6,732,166 B1 | 5/2004 | Woodruff |

(Continued)

FOREIGN PATENT DOCUMENTS

| CN | 1602480 A | 3/2005 |
| CN | 1652090 A | 8/2005 |

(Continued)

*Primary Examiner* — Michael A Keller

(57) ABSTRACT

Embodiments of the present invention provide a cluster system with calculation and storage converged, including: a resource server group, where the resource server group includes at least two resource servers, each resource server in the resource server group has at least one of: a calculation resource and a storage resource, at least one resource server in the resource server group has a calculation resource and a storage resource, and the storage resource includes a persistent disk and a cache that corresponds to the persistent disk; and a storage resource control module, configured to construct a shared storage resource pool by using storage resources in the resource server group, so as to provide a storage service, where storage resources included in each storage resource pool are from at least two resource servers in the resource server group.

11 Claims, 4 Drawing Sheets

Related U.S. Application Data continuation of application No. PCT/CN2012/088109, filed on Dec. 31, 2012.

(52) U.S. Cl.
CPC .......... *G06F 3/0632* (2013.01); *G06F 3/0665* (2013.01); *G06F 3/0689* (2013.01); *H04L 67/1097* (2013.01); *G06F 3/0683* (2013.01)

(56) References Cited

U.S. PATENT DOCUMENTS

| | | |
|---|---|---|
| 6,829,610 B1 | 12/2004 | Hickman et al. |
| 7,565,566 B2 | 7/2009 | Davies et al. |
| 7,624,170 B2 | 11/2009 | Das et al. |
| 7,661,014 B2 | 2/2010 | Davies et al. |
| 8,185,777 B2 | 5/2012 | Davies et al. |
| 8,290,919 B1 | 10/2012 | Kelly et al. |
| 8,396,937 B1 | 3/2013 | O'Krafka et al. |
| 9,733,848 B2 | 8/2017 | Gu et al. |
| 2003/0055972 A1 | 3/2003 | Fuller et al. |
| 2004/0215749 A1 | 10/2004 | Tsao |
| 2006/0004957 A1 | 1/2006 | Hand et al. |
| 2006/0143350 A1 | 6/2006 | Miloushev et al. |
| 2007/0079100 A1 | 4/2007 | Shiga et al. |
| 2008/0263551 A1 | 10/2008 | Ali et al. |
| 2009/0049236 A1 | 2/2009 | Kinoshita |
| 2009/0177860 A1 | 7/2009 | Zhu et al. |
| 2009/0216910 A1 | 8/2009 | Duchesneau |
| 2009/0235269 A1 | 9/2009 | Nakajima et al. |
| 2010/0165188 A1 | 7/2010 | Jannard |
| 2011/0040935 A1 | 2/2011 | Murayama et al. |
| 2011/0066808 A1 | 3/2011 | Flynn et al. |
| 2011/0087833 A1 | 4/2011 | Jones |
| 2011/0134749 A1 | 6/2011 | Speks et al. |
| 2011/0153570 A1 | 6/2011 | Kim |
| 2014/0189128 A1 | 7/2014 | Gu et al. |
| 2015/0019792 A1 | 1/2015 | Swanson et al. |
| 2016/0328151 A1 | 11/2016 | Duran |
| 2017/0222935 A1* | 8/2017 | Kalman .............. H04L 41/0893 |
| 2017/0269854 A1* | 9/2017 | Dimnaku .............. G06F 3/0613 |

FOREIGN PATENT DOCUMENTS

| | | |
|---|---|---|
| CN | 101281454 A | 10/2008 |
| CN | 101374192 A | 2/2009 |
| CN | 102164177 A | 8/2011 |
| CN | 102223409 A | 10/2011 |
| CN | 102520883 A | 6/2012 |
| CN | 102521063 A | 6/2012 |
| CN | 102664923 A | 9/2012 |
| CN | 102696010 A | 9/2012 |
| CN | 102739771 A | 10/2012 |
| CN | 102870381 A | 1/2013 |
| JP | 2001337850 A | 12/2001 |
| JP | 2005512232 A | 4/2005 |
| JP | 2007087102 A | 4/2007 |
| WO | 03050707 A1 | 6/2003 |
| WO | 101169725 A | 4/2008 |
| WO | 2008049738 A1 | 5/2008 |
| WO | 2014101218 A1 | 7/2014 |

* cited by examiner

CLUSTER SYSTEM WITH CALCULATION AND STORAGE CONVERGED

CROSS-REFERENCE TO RELATED APPLICATIONS

This application is a continuation of U.S. patent application Ser. No. 14/041,986 filed on Sep. 30, 2013, which is a continuation of International Patent Application No. PCT/CN2012/088109, filed on Dec. 31, 2012. Both of the aforementioned applications are hereby incorporated by reference in their entireties.

TECHNICAL FIELD

The present invention relates to the field of communications technologies, and in particular, to a cluster system with calculation and storage converged.

BACKGROUND

To implement informatization, an enterprise purchases an information technology (referred to as IT) infrastructure generally including three parts: a server device, a network device, and a storage device, and then the enterprise needs to set up a network by using the three parts and perform various configurations. A whole process is complex and a subsequent operation such as expansion is also complex. The maturity of a virtualization technology and the appearance of a cloud concept facilitate the emergence of an all-in-one machine. In order to reduce the complexity of network construction and subsequent IT device maintenance, main IT device providers (such as the IBM, DELL, HP, CISCO, and etc.) launch "all-in-one machine" products one after another, that is, a server, a storage device, and a network are pre-integrated in one rack. After purchasing this all-in-one machine, a customer does not need to perform complex hardware installation, and furthermore, does not need to perform complex software installation and configuration. After being powered on, an all-in-one machine (a schematic diagram of an architecture of a typical all-in-one machine is shown in FIG. 1) can be used after simple configuration (for example, external network IP configuration).

Two common objectives of various existing all-in-one machines are as follows: (1) reducing the cost, to ensure cost performance that is superior to that of a personal computer (referred to as PC); (2) optimizing the architecture, to ensure that the performance is not poorer than that of the PC. In order to achieve the two objectives, a key point is to efficiently use the storage device.

A storage device in the all-in-one machine generally uses a special storage device such as a storage area network (referred to as SAN) or a network attached storage (referred to as NAS). The special storage device such as the SAN or the NAS has been used as a separate device for a long time, but with the appearance of the cloud computing and an all-in-one machine, inherent disadvantages of the special storage device, such as the SAN or the NAS, used in the all-in-one machine are exposed: the special SAN or NAS requires complex configuration, and subsequent maintenance is difficult; the special SAN or NAS requires a control machine head, and therefore, the cost performance is not high and a low-cost requirement of a user cannot be satisfied; and the special SAN or NAS is controlled by a control machine head, and therefore, the horizontal expansion is limited and linear expansion cannot be implemented, so that a performance requirement of a query of lots of the data bursts cannot satisfied. Due to these disadvantages, a SAN or NAS device becomes a weak link in an all-in-one machine.

SUMMARY

An embodiment of the present invention provides a cluster system with calculation and storage converged, so as to solve problems, in the prior art, that an operation is complex and a cost is higher, because a special SAN is used and a problem that a performance requirement of a query of lots of data bursts cannot be satisfied because linear expansion cannot be implemented.

In a first aspect, an embodiment of the present invention provides a cluster system with calculation and storage converged, where the system includes:

a resource server group, where the resource server group includes at least two resource servers, each resource server in the resource server group has at least one of: a calculation resource and a storage resource, at least one resource server in the resource server group has a calculation resource and a storage resource, and the storage resource includes a persistent disk and a cache that corresponds to the persistent disk; and a storage resource control module, configured to construct a shared storage resource pool by using storage resources in the resource server group, so as to provide a storage service, where storage resources included in each storage resource pool are from at least two resource servers in the resource server group.

In combination with the first aspect, in a first possible implementation manner of the first aspect, the storage resource control module includes:

a cluster view management sub-module, configured to logically divide, according to configuration information preset by a user, the persistent disk in the resource server group to obtain logical partitions, where each logical partition corresponds to a fixed number of physical storage resource blocks on the persistent disk.

In combination with the first possible implementation manner of the first aspect, in a second possible implementation manner, the storage resource control module further includes a data sub-module, and each resource server, having a storage resource, in the resource server group corresponds to one data sub-module; and the cluster view management sub-module is further configured to: allocate the logical partitions to the data sub-module, establish a logical partition topology of the data sub-module, and send allocated logical partition information to the corresponding data sub-module according to a request of the data sub-module.

In combination with the first possible implementation manner of the first aspect and the second possible implementation manner of the first aspect, in a third possible implementation manner, the storage resource control module further includes an interface sub-module, and each resource server in the resource server group corresponds to one interface sub-module; and the interface sub-module is configured to: receive a user volume creation request sent by the user, and allocate, according to the user volume creation request, physical storage resource blocks in the shared storage resource pool to a user volume that needs to be created, where the physical storage resource blocks correspond to the user volume creation request, and the physical storage resource blocks are from different persistent disks.

In combination with the third possible implementation manner of the first aspect, in a fourth possible implementation manner, the interface sub-module is further configured to: receive a data reading/writing operation request sent by the user; obtain, through calculation according to a user volume identifier included in the data reading/writing operation request, a physical storage resource block that corresponds to a data reading/writing operation and a logical partition to which the physical storage resource block belongs; determine, according to the logical partition to which the physical storage resource block belongs, a data sub-module that needs to perform the data reading/writing operation, where the logical partition is obtained through calculation; and send the data reading/writing operation request to the data sub-module that needs to perform the data reading/writing operation.

In combination with the fourth possible implementation manner of the first aspect, in a fifth possible implementation manner, the data sub-module is configured to: write, according to a data writing operation request sent by the interface sub-module, data through a cache of a resource server that corresponds to the data sub-module; or read, according to a data reading operation request sent by the interface sub-module, data through a cache of a resource server that corresponds to the data sub-module.

In combination with the fifth possible implementation manner of the first aspect, in a sixth possible implementation manner, the writing the data through the cache of the resource server that corresponds to the data sub-module specifically includes:

writing, by the data sub-module, the data into the cache of the resource server that corresponds to the data sub-module, and then writing, by the cache, the data into a physical storage resource block that corresponds to the user volume identifier.

In combination with the fifth possible implementation manner of the first aspect, in a seventh possible implementation manner, the reading the data through the cache of the resource server that corresponds to the data sub-module specifically includes:

reading, by the data sub-module, requested data from the cache of the resource server that corresponds to the data sub-module, and if the requested data does not exist in the cache, reading the requested data from a physical storage resource block that corresponds to the user volume identifier, and writing the read requested data into the cache.

In combination with the second possible implementation manner of the first aspect, in an eighth possible implementation manner, if a resource server that has a storage resource is added or deleted in the cluster system, the cluster view management sub-module is further configured to regenerate a logical partition topology of the data sub-module according to a preset logical partition allocation algorithm, broadcast the new logical partition topology to all interface sub-modules and data sub-modules in the cluster system, and instruct an original data sub-module to initiate data migration based on the new logical partition topology.

In combination with the eighth possible implementation manner of the first aspect, in a ninth possible implementation manner, if the resource server that has the storage resource is deleted from the cluster system, the cluster view management sub-module is further configured to, after the data sub-module completes the data migration, set a state of the deleted resource server to an unavailable state.

In combination with the third possible implementation manner of the first aspect and the fourth possible implementation manner of the first aspect, in a tenth possible implementation manner, an interface of the interface sub-module conforms to a small computer system interface protocol.

In combination with the first aspect, in an eleventh possible implementation manner, the storage resource control module is further configured to use a single persistent disk of the resource server that has the storage resource as a separate node to construct the shared storage resource pool.

In combination with the first aspect and any one of the possible implementation manners of the first aspect, in a twelfth possible implementation manner, the storage resource control module is further configured to construct and manage the shared storage resource pool through a distributed algorithm.

In combination with the first aspect and any one of the possible implementation manners of the first aspect, in a thirteenth possible implementation manner, the resource servers in the cluster system perform communication with each other through a high speed data switch network.

In combination with the thirteenth possible implementation manner of the first aspect, in a fourteenth possible implementation manner, the high speed data switch network includes a high speed peripheral component interconnection express PCI-E network or an optical fiber network.

It can be known from the foregoing technical solutions that, with the cluster system with calculation and storage converged provided in the embodiments of the present invention, a special SAN does not exist, thereby omitting complex management of a SAN storage system and solving hardware problems, in the prior art, that an operation is complex and a cost is higher, because a special SAN is used; a plurality of storage devices may exist and a cache may be deployed on each storage device, thereby greatly improving an expansion capability of a cache at a storage end in the terms of hardware; a storage resource does not depend on a calculation resource, and the number of storage resources can be increased or decreased separately, thereby enhancing the expandability of the system; and a persistent disk and a cache resource in the system are virtualized as a shared resource pool and are shared by all calculation, and all calculation and storage can participate in data reading/writing, thereby improving storage performance of the system by improving the concurrency. In addition, the cluster system with calculation and storage converged provided in the embodiments of the present invention performs communication by using a high speed data switch network, thereby further increasing a data switch speed.

BRIEF DESCRIPTION OF DRAWINGS

To describe the technical solutions in embodiments of the present invention or in the prior art more clearly, the accompanying drawings required for describing the embodiments or the prior art are introduced briefly in the following. Apparently, the accompanying drawings in the following description show some of the embodiments of the present invention.

DESCRIPTION OF EMBODIMENTS

In order to make the objectives, technical solutions, and advantages of embodiments of the present invention more clearly, the technical solutions in the embodiments of the present invention are clearly described in the following with reference to the accompanying drawings in the embodiments of the present invention. Apparently, the embodiments to be described are merely a part rather than all of the embodiments of the present invention.

In addition, the term "and/or" in this specification is only an association relationship for describing associated objects and indicates that three kinds of relationships may exist. For example, A and/or B may indicate three cases that only A exists, both A and B exist, or only B exists. In addition, the character "/" in this specification generally indicates that there is an "or" relationship between associated objects before and after the "/".

In the technical solutions provided in the embodiments of the present invention, a calculation resource and a storage resource are vertically integrated, storage resources of resource servers in a cluster system are integrated, and by using a distributed algorithm, a storage resource control module virtualizes storage resources (persistent storage resources and cache resources) in the resource servers as a resource pool to be shared and used for calculation of all the resource servers. The resource servers perform data communication with each other through a high speed data switch network.

Figure 1:
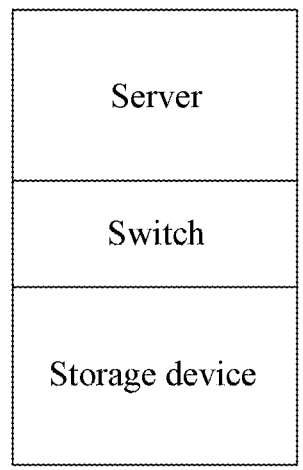
FIG. 1 is a schematic diagram of an architecture of a typical all-in-one machine in the prior art.
Figure 2:
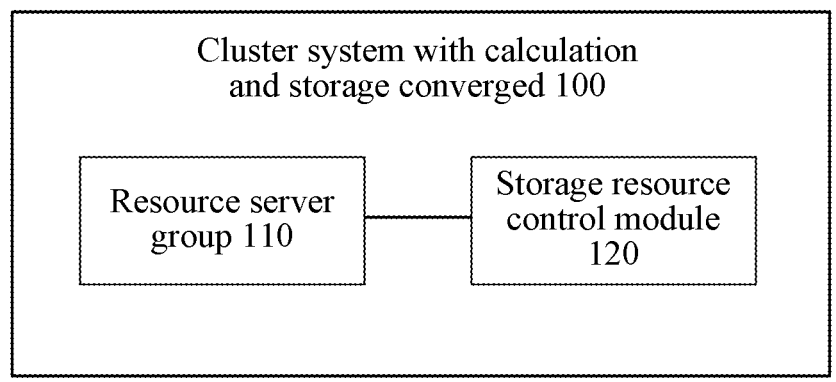
FIG. 2 is a schematic block diagram of a cluster system with calculation and storage converged according to an embodiment of the present invention.

FIG. 2 is a schematic block diagram of a cluster system with calculation and storage converged 100 according to an embodiment of the present invention. As shown in FIG. 2, the cluster system with calculation and storage converged 100 includes:

a resource server group 110, where the resource server group includes at least two resource servers, each resource server in the resource server group has at least one of: a calculation resource and a storage resource, at least one resource server in the resource server group has a calculation resource and a storage resource, and the storage resource includes a persistent disk and a cache that corresponds to the persistent disk; and a storage resource control module 120, configured to construct a shared storage resource pool by using storage resources in the resource server group, so as to provide a storage service, where storage resources included in each storage resource pool are from at least two resource servers in the resource server group.

In this embodiment of the present invention, a device, providing a calculation resource and a storage resource, in the cluster system with calculation and storage converged is from a resource server group, the resource server group is formed by two or more resource servers, each resource server can provide a calculation resource and/or a storage resource, and at least one resource server can provide both a calculation resource and a storage resource; and the storage resource control module in the cluster system with calculation and storage converged manages one or more shared storage resource pools to provide a virtual storage service, where the shared storage resource pool is built by using storage resources in the resource server group, and storage resources included in each storage resource pool are from two or more resource servers in the resource server group.

In this embodiment of the present invention, each resource server in the resource server group has at least one of: a calculation resource and a storage resource, and at least one resource server in the resource server group has a calculation resource and a storage resource, that is, a storage resource and a calculation resource of a system are deployed jointly, and therefore, an input cost of a device, a space occupation cost of the device, and an energy consumption cost of the device can be saved; and furthermore, a storage resource pool is formed by storage resources of at least two resource servers in the resource server group, and therefore, storage resources of the resource servers can be balanced and utilization efficiency and reliability of the storage resources can be improved.

Therefore, with the cluster system with calculation and storage converged provided in this embodiment of the present invention, a special SAN does not exist, thereby omitting complex management of a SAN storage system and solving hardware problems, in the prior art, that an operation is complex and a cost is higher, because a special SAN is used; a plurality of storage devices may exist and each storage device includes a persistent disk and a cache, thereby greatly improving an expansion capability of a cache at a storage end in the terms of hardware; a storage resource does not depend on a calculation resource, and the number of storage resources can be increased or decreased separately, thereby enhancing the expandability of the system; and a persistent disk and a cache resource in the system are virtualized as a shared resource pool and are shared by all calculation, and all calculation and storage can participate in data reading/writing, thereby significantly improving storage performance of the system by improving the concurrency.

In this embodiment of the present invention, the storage resource control module may be deployed on a resource server and may also be deployed separately.

In this embodiment of the present invention, optionally, the storage resource control module 120 may further be configured to create and manage the storage resource pool through a distributed algorithm. For example, the storage resource control module creates and manages the storage resource pool through a distributed algorithm such as a distributed hash table (Distributed Hash Table, referred to as "DHT") or a pseudo-random algorithm, so that the system can provide a uniformly shared storage service.

Optionally, the storage resource control module 120 may further use a single persistent disk of the resource server that has the storage resource as a separate node to construct the shared storage resource pool.

In this embodiment of the present invention, a uniform hardware server architecture is used by the calculation resource and the storage resource, and the calculation resource and the storage resource are deployed in a unification manner, so that a calculation capability and a storage capability of a physical server can be fully utilized. That is to say, each resource server included in the system can provide a calculation resource and/or a storage resource at the same time. In a deployment form, a resource server that provides a storage resource and/or a calculation resource are the same physical device in a physical deployment form, that is, the storage resource and the calculation resource are deployed on one server in a unification manner, and the calculation resource and the storage resource are logically independent from each other and their own resource pools may be construct separately.

Further, in order to converge calculation and storage deeply, the cluster system with calculation and storage converged provided in this embodiment of the present invention may use a pure high speed peripheral component interconnection express (Peripheral Component Interconnection Express, referred to as PCI-E) switch architecture. Based on the PCI-E switch architecture, all resource servers including calculation and storage can be interconnected directly through a PCI-E interface to perform non-blocking switch, so that a channel between the calculation and the storage in the cluster system is more rapid.

Specifically, because each part of the cluster system with calculation and storage converged provided in this embodiment of the present invention may use pure PCI-E switch, all units, including a calculation device, a storage device, and a direct disk pack, can be directly mounted to a PCI-E switch network, and adaptation between different protocols is not required, thereby further increasing a data switch speed.

It should be understood that, the foregoing PCI-E network is only a possible implementation manner of the high speed data switch network used in this embodiment of the present invention, which is not limited in this embodiment of the present invention. For example, in an actual application, an optical fiber network may also be used as the high speed data switch network of the cluster system.

Figure 3:
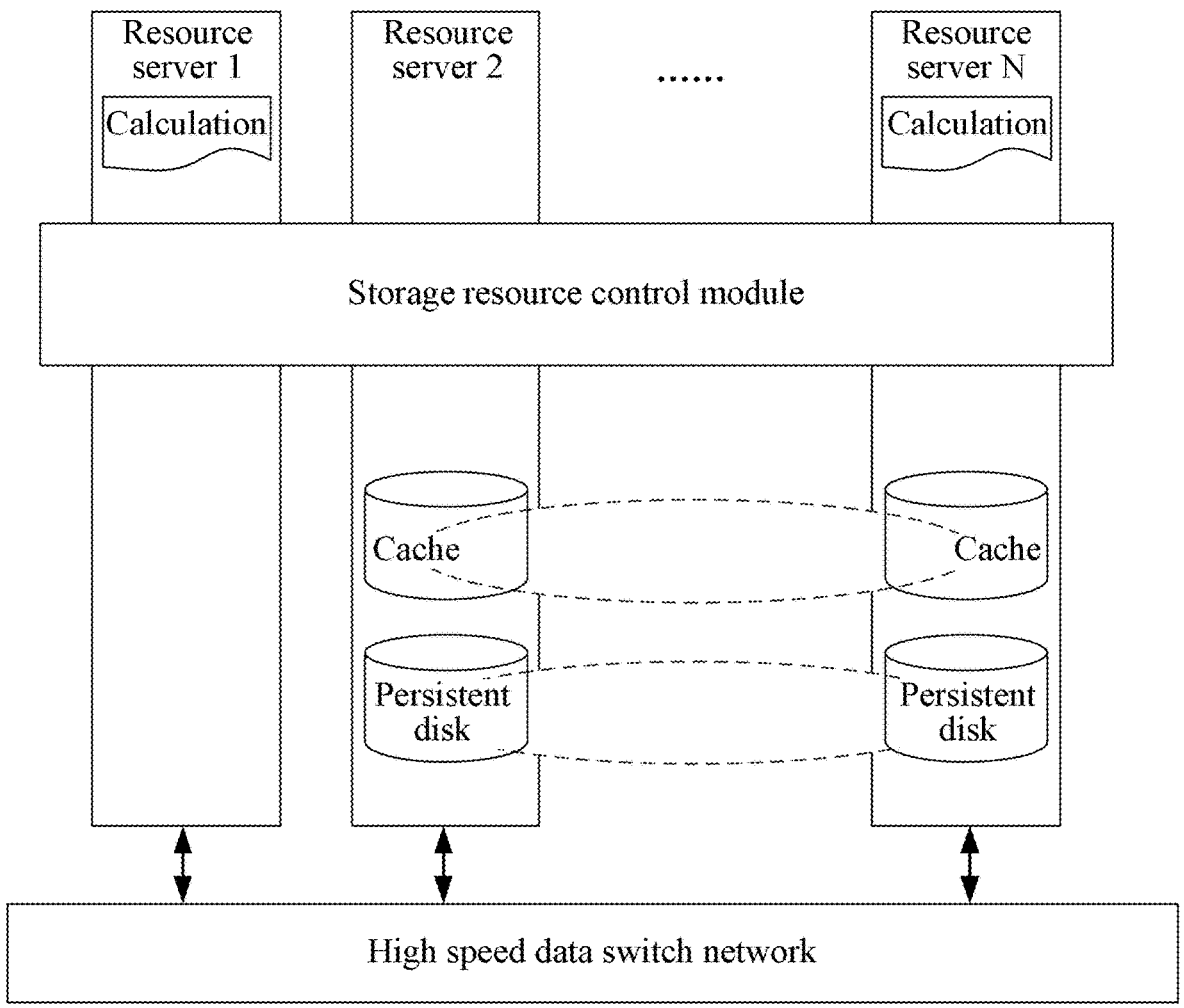
FIG. 3 is a schematic structural diagram of a cluster system with calculation and storage converged according to an embodiment of the present invention.

FIG. 3 is a schematic structural diagram of a cluster system with calculation and storage converged according to an embodiment of the present invention. As shown in FIG. 3, the cluster system with calculation and storage converged in this embodiment is formed by a high speed data switch network, a resource server group, and a storage resource control module, where the resource server group includes three resource servers, that is, a resource server 1, a resource server 2, and a resource server 3. The resource server 1 has only a calculation resource, the resource server 2 has only a storage resource, and the resource server 3 has both a calculation resource and a storage resource. The storage resources of the resource server 2 and the resource server 3 are built as a uniformly shared storage resource pool, where the shared storage resource pool includes a shared cache resource and a shared persistent disk.

It should be noted that, FIG. 3 is only an example of deployment of the cluster system with calculation and storage converged. In an actual application, more resource servers may be deployed, and both a calculation resource and a storage resource may also be deployed on each resource server. A persistent disk may be a hard disk driver (Hard Disk Driver, referred to as HDD) or a solid state disk (Solid State Disk, referred to as SSD).

The cluster system with calculation and storage converged may bring the following benefits: a plurality of storage devices may exist and a cache may be deployed on each storage device, thereby greatly improving an expansion capability of a cache at a storage end in the terms of hardware; and a storage resource does not depend on a calculation resource, and the number of storage resources can be increased or decreased separately, thereby enhancing the expandability of the system.

Figure 4:
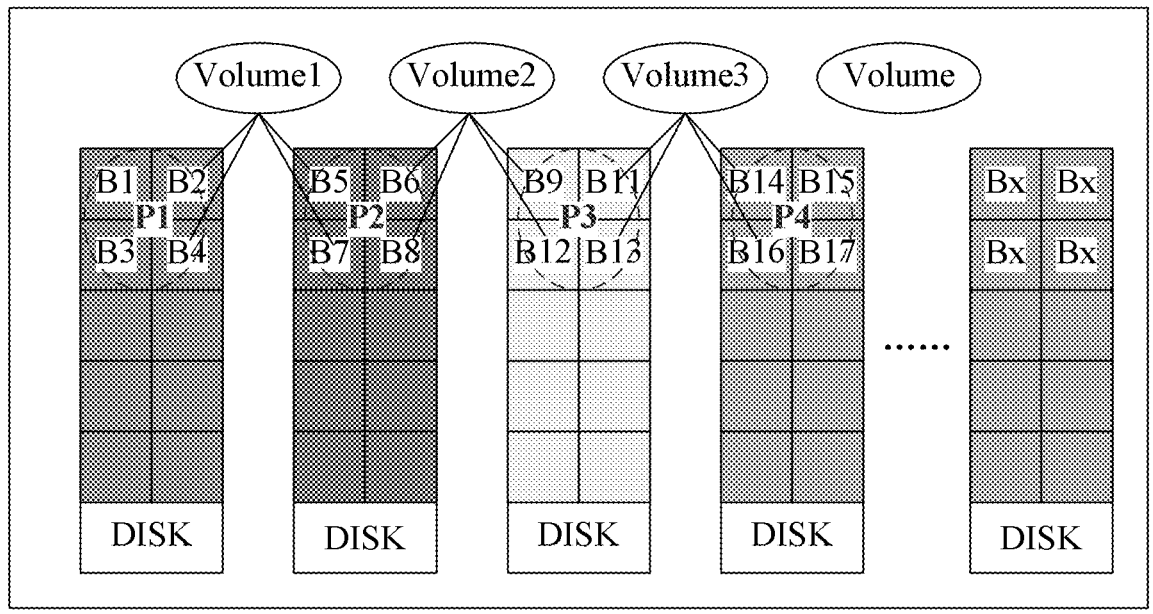
FIG. 4 is a schematic diagram of formation of disk partitions and user volumes according to an embodiment of the present invention.

Further, based on an architecture of the cluster system with calculation and storage converged shown in FIG. 3, a special SAN is omitted and the storage resources are dispersed on the resource servers, and therefore, the dispersed storage resources need to be uniformly managed through the storage resource control module, which specifically includes:

(1) when the cluster system is initialized, dividing a disk in the system according to a Block (for example, 1 M) of a fixed size (for example, division of each DISK in FIG. 4);

(2) forming, through the storage resource control module, one partition (Partition, referred as PT, referring to a block marked with P in FIG. 4) by a certain number of Blocks, where, as shown in FIG. 4, each partition is formed by 4 Blocks, and the partition is a logical partition and is invisible to a user;

(3) when the user creates a volume (Volume), designating, by the storage resource control module, a Block that belongs to the volume, where, as shown in FIG. 4, a Block2, a Block4, a Block5, and a Block7 belong to a Volume1, a Block6, a Block8, a Block9, and a Block12 belong to a Volume2, and a Block11, a Block13, a Block14, and a Block16 belong to a Volume3, and the volume is visible to the user; and (4) when the user performs data reading/writing on the volume, calculating, by the storage resource control module and according to its own algorithm, a Block on which a reading/writing operation is performed, calculating, according to a certain algorithm (for example, a Hash algorithm), a Partition corresponding to each Block, and completing the data reading/writing operation according to the Partition.

In this way, actual physical storage resources of one user volume are distributed on many disks. In this way, a purpose that different disk resources are shared with one user volume for a user to use is achieved, that is, a purpose that storage resources are shared for use is achieved. When the user performs data reading/writing on the volume, after a data reading/writing request is processed by the storage resource control module, performing data reading/writing on the volume is converted to performing distributed reading/writing on different Partitions in the volume.

It should be noted that, before the cluster system is started, the user makes a configuration file of the cluster system according to a requirement of the user, where information such as deployment of the storage resource control module in the cluster system, a partition specification (for example, the number of Partitions) of the cluster system, and an address for communication between different resource servers is planned in the configuration file.

Figure 5:
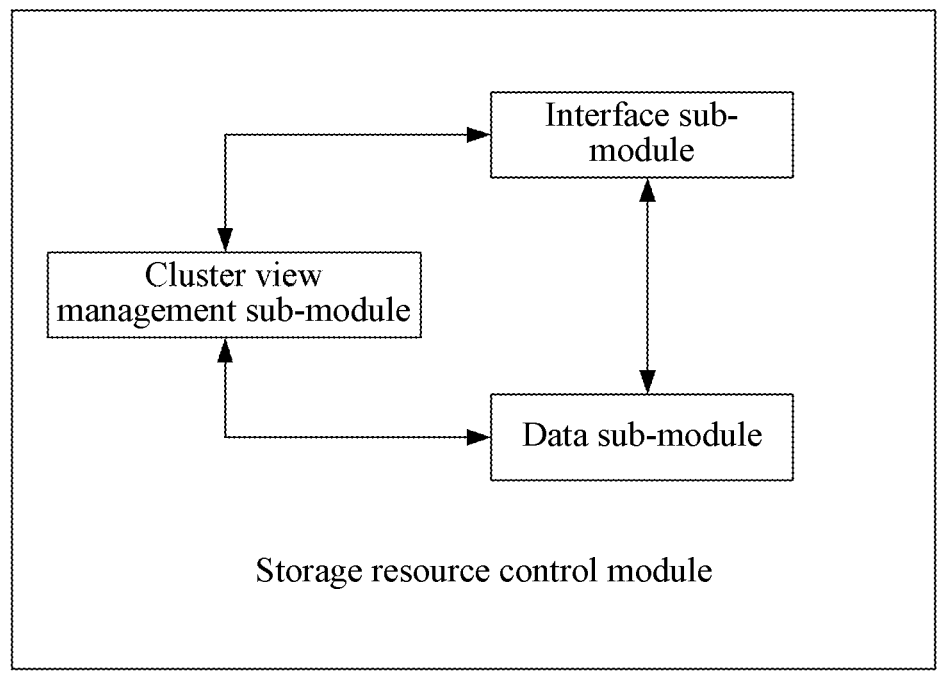
FIG. 5 is a schematic structural diagram of a storage resource control module in a cluster system with calculation and storage converged according to an embodiment of the present invention.

As shown in FIG. 5, in order to implement the foregoing functions, the storage resource control module includes:

a cluster view management sub-module, configured to logically divide, according to configuration information preset by a user, a persistent disk in the resource server group to obtain logical partitions, where each logical partition corresponds to a fixed number of physical storage resource blocks on the persistent disk.

Further, the storage resource control module further includes a data sub-module, where each resource server, having a storage resource, in the resource server group corresponds to one data sub-module.

It should be understood that, in an actual application, the data sub-module may be deployed on each resource server that has the storage resource.

Accordingly, the cluster view management sub-module is further configured to: allocate the logical partitions to the data sub-module, establish a logical partition topology of the data sub-module, and send allocated logical partition information to the corresponding data sub-module according to a request of the data sub-module.

Further, the storage resource control module further includes an interface sub-module, where each resource server in the resource server group corresponds to one interface sub-module.

It should be understood that, in an actual application, the interface sub-module may be deployed on each resource server. The interface sub-module may use an interface that conforms to a small computer system interface protocol.

The interface sub-module is configured to: receive a user volume creation request sent by the user, and allocate, according to the user volume creation request, physical storage resource blocks in the shared storage resource pool to a user volume that needs to be created, where the physical storage resource blocks correspond to the user volume creation request, and the physical storage resource blocks are from different persistent disks.

Further, the interface sub-module is further configured to: receive a data reading/writing operation request sent by the user; obtain, through calculation according to a user volume identifier included in the data reading/writing operation request, a physical storage resource block that corresponds to a data reading/writing operation and a logical partition to which the physical storage resource block belongs; determine, according to the logical partition to which the physical storage resource block belongs, a data sub-module that needs to perform the data reading/writing operation, where the logical partition is obtained through calculation; and send the data reading/writing operation request to the data sub-module that needs to perform the data reading/writing operation.

Accordingly, the data sub-module is configured to: write, according to a data writing operation request sent by the interface sub-module, data through a cache of a resource server that corresponds to the data sub-module; or read, according to a data reading operation request sent by the interface sub-module, data through a cache of a resource server that corresponds to the data sub-module.

Specifically, the writing the data through the cache of the resource server that corresponds to the data sub-module includes:

writing, by the data sub-module, the data into the cache of the resource server that corresponds to the data sub-module, and then writing, by the cache, the data into a physical storage resource block that corresponds to the user volume identifier.

Specifically, the reading the data through the cache of the resource server that corresponds to the data sub-module includes:

reading, by the data sub-module, requested data from the cache of the resource server that corresponds to the data sub-module, and if the requested data does not exist in the cache, reading the requested data from a physical storage resource block that corresponds to the user volume identifier, and writing the read requested data into the cache.

Optionally, if a resource server that has a storage resource is added or deleted in the cluster system, the cluster view management sub-module is further configured to regenerate a logical partition topology of the data sub-module according to a preset logical partition allocation algorithm, broadcast the new logical partition topology to all interface sub-modules and data sub-modules in the cluster system, and instruct an original data sub-module to initiate data migration based on the new logical partition topology.

If the resource server that has the storage resource is deleted from the cluster system, the cluster view management sub-module is further configured to, after the data sub-module completes the data migration, set a state of the deleted resource server to an unavailable state.

Based on the cluster system with calculation and storage converged provided in this embodiment of the present invention, a special SAN does not exist, thereby omitting complex management of a SAN storage system and solving hardware problems, in the prior art, that an operation is complex and a cost is higher, because a special SAN is used; a plurality of storage devices may exist and a Cache may be deployed on each storage device, thereby greatly improving an expansion capability of a Cache at a storage end in the terms of hardware; a storage node does not depend on a calculation node, and the number of storage nodes can be increased or decreased separately, thereby enhancing the expandability of the system. In addition, because each part of an all-in-one machine system provided in this embodiment of the present invention uses pure PCI-E switch, all units, including a calculation node, a storage node, and a direct disk pack, are directly mounted to PCI-E switch network, and adaptation between different protocols is not required, thereby further increasing a data switch speed.

As a specific application of the cluster system with calculation and storage converged provided in this embodiment of the present invention, functions of the storage resource control module in the system may be implemented through distributed storage control software.

In order to understand the technical solution in this embodiment of the present invention more clearly, the technical solution in this embodiment of the present invention is further described by taking the distributed storage control software as an example.

Specifically, the distributed storage control software mainly includes three functional modules: a Meta Data Controller (referred to as MDC) module, a Virtualization Block Service (referred to as VBS) module, and an Object Storage Device (referred to as OSD) module, The MDC module is mainly configured to: implement status view control of a distributed cluster system; update an input/output (Input/Output, referred to as I/O) view, a partition allocation view, a node view when a resource server is added in or exits from the cluster system; and control a data distribution rule and a data reconstructing rule.

The VBS module is mainly configured to implement an access interface of a block device that is based on a small computer system interface (Small Computer System Interface, referred to as SCSI), and complete saving and access logic of block-stored metadata. In addition, the VBS module further receives an I/O view delivered by the MDC module, and then forwards data to a corresponding OSD node (that is, a resource server on which an OSD module is deployed) according to a view rule, where the I/O view may be delivered actively by the MDC module to the VBS module and may also be acquired actively by the VBS module from the MDC module.

The OSD module is mainly configured to implement a reading/writing cache function and consistent backup of data, and organize disk data access. In addition, the OSD module mainly receives an OSD view delivered by the MDC module, and then receives a reading/writing command of the VBS module to complete data storage and acquisition.

In an actual application, the MDC module may be deployed on only two resource servers (one is an active resource server and the other is a standby resource server) or three resource servers (one is an active resource server and the other two resource servers are standby resource servers) of the cluster system. The VBS module is deployed on each resource server of the cluster system and is used as a driver.

The OSD module is deployed on each resource server that has a storage resource in the cluster system, and is used for controlling a local storage resource. A specific deployment manner may be executed according to a configuration file provided by a user. The configuration file includes deployment of the foregoing functional modules, a partition specification (that is, the number of parts obtained by dividing each hard disk) of the cluster system, address information (including address information of the MDC module, the VBS module, and the OSD module) for communication between different resource servers, and the like.

Figure 6:
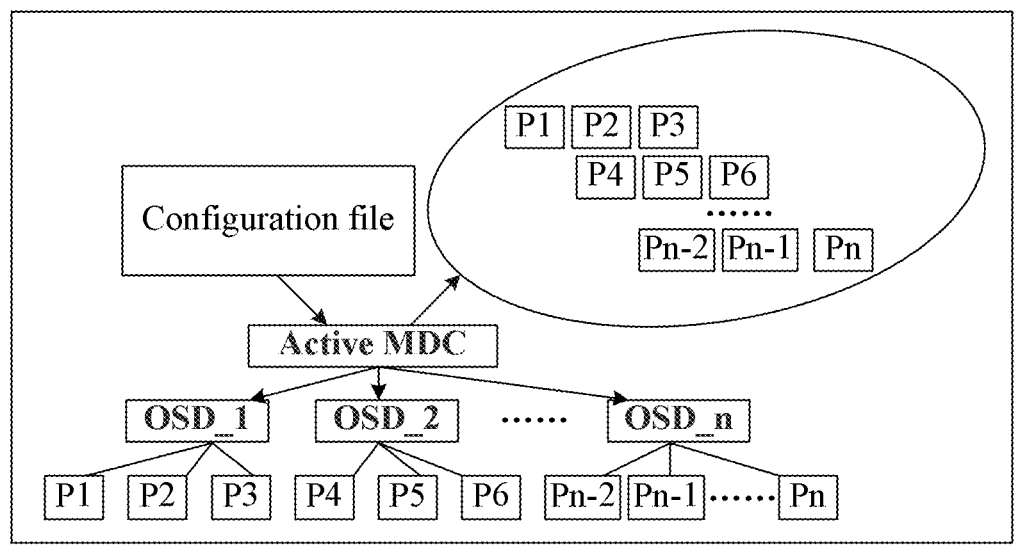
FIG. 6 is a schematic diagram of a topology that an MDC module allocates a partition resource to an OSD node according to an embodiment of the present invention.

After the system is started, the user imports configuration information into the system through a management end of the system, and the MDC module establishes partition information of the system according to the imported configuration information, then establishes a logical OSD node (to which a real OSD node is mapped at the MDC module side) according to an OSD node adding request delivered by the system, and allocates a resource (that is, partition information corresponding to an OSD module on each resource server) such as a partition to each OSD node. FIG. 6 is a schematic diagram of a topology that an MDC module allocates a partition resource to an OSD node. After an OSD module on a resource server is activated, the OSD module requests partition information from an MDC module, and the MDC module sends allocated partition resource information to the corresponding OSD module according to the request.

When a VBS module in a system is also activated, the MDC module, the VBS module, and the OSD module in the system are all in an activated state and establish connections among one another. Meanwhile, the MDC module also establishes global partition information and completes partition resource allocation for and synchronization with each OSD node.

After the system completes an initialization process, the VBS module creates one user volume according to a user volume creation command initiated by a user, where the user volume includes volume ID information and a volume size, and determines which Blocks form the user volume, and different Blocks may belong to the same partition and may also belong to different partitions.

Therefore, actual physical storage resources of one user volume are distributed on many disks. In this way, a purpose that different disk resources are shared with one user volume for a user to use is achieved, that is, a purpose that storage resources are shared for use is achieved.

Optionally, when a resource server needs to be added in the cluster system provided in this embodiment of the present invention, a user performs an operation through a management end of the system to send a resource server adding message to an MDC module (an active MDC module in the system) in the system; the MDC module performs a parameter (including a topology result, an IP address, and the like) check on a newly added resource server according to the received message; after the check succeeds, the MDC module performs (1) topology calculation, to add the newly added resource server to a topology diagram of an OSD view, and (2) partition structure calculation, to regenerate a new partition view according to a partition allocation algorithm; after the foregoing calculation is completed, the MDC module broadcasts new partition view information to all VBS modules and OSD modules in the system; and then, the MDC module notifies an original OSD module in the system to initiate a data migration process (according to a new partition topology, data on the original OSD node is migrated to a newly added node).

Optionally, when a resource server needs to be deleted from the cluster system provided in this embodiment of the present invention, a procedure is similar to the foregoing procedure of adding a resource server, where a user also performs an operation through a management end of the system, and the MDC module performs partition calculation again after receiving a message, notifies each OSD module and VBS module in the system after the calculation, and then notifies the OSD module to initiate data migration.

A difference from the procedure of adding a resource server is that, in the procedure of deleting a resource server, after the data migration is completed, the MDC module sets a state of the deleted resource server to an unavailable state. Then, the user may withdraw the deleted resource server from the cluster system.

In the cluster system with calculation and storage converged provided in this embodiment of the present invention, in the process of adding or deleting a resource server, the MDC module performs partition allocation calculation according to a node change condition and notifies each OSD module and VBS module of the change condition.

In the following, in the cluster system with calculation and storage converged provided in this embodiment of the present invention, how a user implements shared use of storage resources in a data writing process is described by taking that a client user initiates a data writing operation request for a volume in a resource server 2 as an example.

First, after the data writing operation request is processed by a corresponding application program in the resource server 2, data writing is required with a standard data access interface (which may be a file interface, and may also be a block interface), and the data writing operation request is sent to a VBS module in the resource server 2.

Then, the VBS module obtains, through analysis and calculation according to its own algorithm (for example, a distributed algorithm such as a DHT), a logical OSD node that needs to write data (including obtaining, through calculation, a Block into which the data needs to be written and a partition to which the Block belongs to). The VBS module divides, according to its own algorithm, the data that needs to be written (the data is divided through an algorithm as evenly as possible), and sends the data writing operation request to OSD modules in resource servers that correspond to the logical OSD node.

For example, the VBS module obtains, through calculation and analysis, that Blocks into which the data needs to be written belong to partitions P6 and P7, where P6 and P7 belong to an OSD node in the resource server 2 and an OSD node in a resource server 3 respectively, and the VBS module divides, according to its own algorithm, the data that needs to be written (the data is divided through an algorithm as evenly as possible), and sends the data writing operation request to the OSD module in the resource server 2 and the OSD module in the resource server 3.

And then, after receiving the data writing operation request, the OSD module in the resource server 2 and the OSD module in the resource server 3 write the data into caches of local resource servers respectively, and then the cache of the resource server 2 and the cache of the resource server 3 write the data into designated physical space of their respective persistent disks.

Finally, in order to ensure the reliability of data writing, the cache of the resource server 2 and the cache of the resource server 3 write the data into other idle physical space of the persistent disks of the local resource servers respectively, thereby completing a data writing procedure.

It should be noted that, the last step may be performed by caches asynchronously and concurrently.

In this way, after one data writing request is processed through the foregoing steps, data is written into caches of different resource servers in a distributed and concurrent manner, and a cache of each resource server writes the data into a local persistent disk, thereby improving data writing efficiency and implementing shared use of a disk. After the data writing is completed, correspondence between a logical partition in the OSD module and an actual physical disk partition is established.

Further, in the cluster system with calculation and storage converged provided in this embodiment of the present invention, how a user implements shared use of storage resources in a data reading process is described by taking that a client user initiates a data reading operation request for a volume in the resource server 2 as an example.

First, after the data reading operation request is processed by a corresponding application program in the resource server 2, data reading is required with a standard data access interface (which may be a file interface, and may also be a block interface), and the data reading operation request is sent to a VBS module in the resource server 2.

Then, the VBS module obtains, through analysis and calculation according to its own algorithm (for example, a distributed algorithm such as a DHT), a logical OSD node that needs to read data (including obtaining, through calculation, a Block from which the data needs to be read and a partition to which the Block belongs to), and sends the data reading operation request to OSD modules in resource servers that correspond to the logical OSD node.

For example, the VBS module obtains, through calculation and analysis, that Blocks from which the data needs to be read belong to partitions P6 and P7, where P6 and P7 belong to an OSD node in the resource server 2 and an OSD node in the resource server 3 respectively, and the VBS module sends the data reading operation request to the OSD module in the resource server 2 and the OSD module in the resource server 3.

Finally, after receiving the data reading operation request, the OSD module in the resource server 2 and the OSD module in the resource server 3 first read the data from caches of local resource servers, if the required data does not exist in the caches, read the data from local persistent disks, and after reading the data from the local persistent disks, first store the data into the caches, so as to read the data from the caches next time.

Therefore, after one data reading request is processed through the foregoing steps, data may be read from caches of different resource servers in a distributed and concurrent manner (when required data does not exist in a cache, the data is read from a persistent disk), thereby improving data reading efficiency and implementing shared use of a disk.

In the cluster system with calculation and storage converged provided in this embodiment of the present invention, as persistent storage resources in the cluster system increase, caches of the whole cluster system increase linearly. The increase of the caches means that, when the system reads/writes data, more distributed and concurrent processing is performed on the same task, the efficiency is higher, and the whole performance of the system is continuously improved with the expansion of the system.

With the cluster system with calculation and storage converged provided in this embodiment of the present invention, a special SAN does not exist, thereby omitting complex management of a SAN storage system and solving hardware problems, in the prior art, that an operation is complex and a cost is higher, because a special SAN is used; a plurality of storage devices may exist and a cache may be deployed on each storage device, thereby greatly improving an expansion capability of a cache at a storage end in the terms of hardware; a storage resource does not depend on a calculation resource, and the number of storage devices can be increased or decreased separately, thereby enhancing the expandability of the system. In addition, the cluster system with calculation and storage converged provided in this embodiment of the present invention uses a high speed data switch network for communication, thereby further increasing a data switch speed.

It should be understood that, in the embodiments of the present invention, "B corresponding to A" indicates that B is associated with A and B may be determined according to A. However, it should further be understood that, the determining B according to A does not mean that B is determined only according to A, and B may also be determined according to A and/or other information.

Persons of ordinary skill in the art may realize that, units and algorithm steps of each example described in the embodiments disclosed in this specification can be implemented by electronic hardware, computer software, or a combination of the two. In order to clearly describe the interchangeability between the hardware and the software, compositions and steps of each example have been generally described according to functions in the foregoing descriptions. Whether these functions are executed in hardware manner or in a software manner depends upon the particular application and design constraint conditions of the technical solutions. Persons skilled in the art may use different methods to implement the described functions for each particular application, but it should not be considered that such implementation goes beyond the scope of the present invention.

In the embodiments provided in the present application, it should be understood that the disclosed system may be implemented in other ways. For example, the system embodiment described in the foregoing is merely exemplary. For example, the unit division is merely logical function division and may be other division in actual implementation. For example, a plurality of units or components may be combined or integrated into another system, or some features may be ignored or not executed. In addition, the shown or discussed coupling or direct coupling or communication connection may be indirect coupling or communication connection through some interfaces, apparatuses or units and may also be implemented electrically, mechanically, or in other forms.

The units described as separate components may be or may not be physically separated. Components shown as units may be or may not be physical units, that is, may be located in one place, or may be distributed on a plurality of network units. A part or all of the units may be selected to achieve the objectives of the solutions in the embodiments of the present invention according to an actual demand.

In addition, functional units in each embodiment of the present invention may be integrated in one processing unit, or each functional unit may exist as a separate physical unit, or two or more units may also be integrated in one unit. The integrated units may be implemented in the form of hardware, and may also be implemented in the form of a software functional unit.

When the integrated units are implemented in the form of a software functional unit and sold or used as a separate product, the integrated units may be stored in a computer readable storage medium. Based on such an understanding, the technical solutions of the present invention or the part that makes contributions to the prior art or all or a part of the technical solutions may be substantially embodied in the form of a software product. The computer software product is stored in a storage medium, and includes several instructions to instruct a computer device (which may be a personal computer, a server, or a network device) to perform all or a part of steps of the methods described in the embodiments of the present invention. The storage medium includes various media capable of storing program codes, such as, a USB flash disk, a mobile hard disk, a read-only memory (ROM), a random access memory (RAM), a magnetic disk, or an optical disk.

The foregoing descriptions are merely specific embodiments of the present invention, but are not intended to limit the protection scope of the present invention. Various equivalent modifications or replacements readily figured out by persons skilled in the prior art within the technical scope disclosed in the present invention should all fall within the protection scope of the present invention. Therefore, the protection scope of the present invention should be subject to the protection scope of the claims.

What is claimed is:

1. A system, comprising:
a first resource server comprising a first calculation resource and a first storage resource, wherein the first storage resource comprises a first persistent disk and a first cache associated with the first persistent disk, wherein the first persistent disk is a hard disk driver (HDD) or a solid state disk (SSD), and wherein the first calculation resource is coupled to the first storage resource through a Peripheral Component Interconnect Express (PCIe) interface;
a second resource server comprising a second calculation resource and a second storage resource, wherein the second storage resource comprises a second persistent disk and a second cache associated with the second persistent disk, and the first and second persistent disks together form a storage resource pool, and wherein the second persistent disk is a HDD or an SSD and the second calculation resource is coupled to the second storage resource through another PCIe interface, and
a third resource server configured to receive a user request from the first calculation resource or the second calculation resource to create a user volume, and to determine storage resource to be allocated for the user volume from the storage resource pool.

2. The system according to claim 1, wherein the allocated storage resource is distributed from both the first and the second persistent disks.

3. The system according to claim 1, wherein the first resource server in the system performs communication with the second resource server through a data switch network, wherein the data switch network comprises a PCI-E network or an optical fiber network.

4. The system according to claim 1, wherein one of the first and the second resource servers comprises a cluster view management component, and is configured to divide, via the cluster view management component, the first and the second persistent disks of the storage resource pool to obtain logical partitions, wherein each of the logical partitions is associated with a number of physical storage resource blocks of the storage resource pool.

5. The system according to claim 1, wherein
each resource server comprises an interface component, and the third resource server is configured to receive the user request to create the user volume via the interface component,
wherein each of the first and second resource servers comprises a data component, configured to perform data writing or reading operation via the data component, and
wherein the third resource server comprises a cluster view management component, configured to manage logical partitions via the cluster view management component wherein the first and second persistent disks of the storage resource pool are logically divided into logical partitions.

6. A system, comprising:
a first resource server comprising a first calculation resource and a first storage resource, wherein the first storage resource comprises a first persistent disk and a first cache associated with the first persistent disk, wherein the first persistent disk is a HDD or an SSD, and wherein the first calculation resource is coupled to the first storage resource through a PCIe interface; and
a second resource server comprising a second calculation resource and a second storage resource, wherein the second storage resource comprises a second persistent disk and a second cache associated with the second persistent disk, and the first and second persistent disks together form a storage resource pool, and wherein the second persistent disk is a HDD or an SSD and the second calculation resource is coupled to the second storage resource through another PCIe interface,
wherein the first resource server is configured to receive a user request from the first calculation resource or the second calculation resource to create a user volume, and to determine storage resource to be allocated for the user volume from the storage resource pool.

7. A storage resource allocating method, comprising:
forming a storage resource pool from a first persistent disk and a second persistent disk, wherein a first resource server comprises a first calculation resource and a first storage resource, and the first storage resource comprises the first persistent disk and a first cache associated with the first persistent disk, wherein the first persistent disk is a HDD or an SSD and the first calculation resource is coupled to the first storage resource through a PCIe interface, wherein a second resource server comprises a second calculation resource and a second storage resource, and the second storage resource comprises the second persistent disk and a second cache associated with the second persistent disk, and wherein the second persistent disk is a HDD or an SSD, and the second calculation resource is coupled to the second storage resource through another PCIe interface; and
receiving, from a third resource server, a user request from the first calculation resource or the second calculation resource to create a user volume, and to determine storage resource to be allocated for the user volume from the storage resource pool.

8. The method according to claim 7, wherein the allocated storage resource is distributed from both the first and the second persistent disks.

9. The method according to claim 7, wherein the first resource server performs communication with the second resource server through a data switch network, wherein the data switch network comprises a PCI-E network or an optical fiber network.

10. The method according to claim 7, wherein one of the first and the second resource servers comprises a cluster view management component; the method further comprises:

dividing, via the cluster view management component, the first and the second persistent disks of the storage resource pool to obtain logical partitions, wherein each of the logical partitions is associated with a number of physical storage resource blocks of the storage resource pool.

11. A storage resource allocating method, comprising:

forming a storage resource pool from a first persistent disk and a second persistent disk, wherein a first resource server comprises a first calculation resource and a first storage resource, and the first storage resource comprises the first persistent disk and a first cache associated with the first persistent disk, wherein the first persistent disk is a HDD or an SSD and the first calculation resource is coupled to the first storage resource through a PCIe interface, wherein a second resource server comprising a second calculation resource and a second storage resource, and the second storage resource comprises the second persistent disk and a second cache associated with the second persistent disk, and wherein the second persistent disk is a HDD or an SSD, and the second calculation resource is coupled to the second storage resource through another PCIe interface; and receiving, from the first resource server, a user request from the first calculation resource or the second calculation resource to create a user volume, and to determine storage resource to be allocated for the user volume from the storage resource pool.

\* \* \* \* \*